(12) United States Patent
Prantl et al.

(10) Patent No.: US 9,161,014 B2
(45) Date of Patent: Oct. 13, 2015

(54) ESTIMATION OF DEFOCUSED REFLECTANCE MAPS FOR THE ROBUST DETERMINATION OF "SHAPE FROM FOCUS" IN MICROSCOPIC IMAGES

(75) Inventors: Manfred Prantl, Graz (AT); Stefan Scherer, Graz (AT); Martin Lenz, Graz (AT); Matthias Ruther, Graz (AT); Horst Bischof, Eggersdorf B. Graz (AT)

(73) Assignees: Alicona Imaging GmbH, Raaba (AT); Technische Universität Graz, Graz (AT)

( * ) Notice: Subject to any disclaimer, the term of this patent is extended or adjusted under 35 U.S.C. 154(b) by 372 days.

(21) Appl. No.: 13/810,831

(22) PCT Filed: Jul. 26, 2011

(86) PCT No.: PCT/EP2011/062846
§ 371 (c)(1),
(2), (4) Date: Jan. 17, 2013

(87) PCT Pub. No.: WO2012/013686
PCT Pub. Date: Feb. 2, 2012

(65) Prior Publication Data
US 2013/0113896 A1 May 9, 2013

(30) Foreign Application Priority Data
Jul. 27, 2010 (AT) ................ A 1260/2010

(51) Int. Cl.
*G01B 11/25* (2006.01)
*H04N 13/02* (2006.01)
*G06T 7/00* (2006.01)

(52) U.S. Cl.
CPC ........ *H04N 13/0207* (2013.01); *G01B 11/2513* (2013.01); *G06T 7/0069* (2013.01); *G06T 2207/10056* (2013.01); *G06T 2207/10152* (2013.01)

(58) Field of Classification Search
CPC ........... G01B 11/2513; H04N 13/0207; G06T 7/0069
See application file for complete search history.

(56) References Cited

U.S. PATENT DOCUMENTS

| | | | | |
|---|---|---|---|---|
| 5,381,236 A * | 1/1995 | Morgan | | 356/609 |
| 5,608,529 A * | 3/1997 | Hori | | 356/609 |
| 2011/0043661 A1* | 2/2011 | Podoleanu | | 348/239 |
| 2011/0262030 A1* | 10/2011 | Sahay et al. | | 382/154 |

FOREIGN PATENT DOCUMENTS

DE   10 2008 041 070 A1   2/2010

OTHER PUBLICATIONS

S.K. Nayar, "Shape from Focus System," Proceeding of the Computer Society Conference on Computer Vision and Pattern Recognition, New York, IEEE, vol. 15, Jun. 15, 1992, pp. 302-308.

* cited by examiner

*Primary Examiner* — Jefferey Harold
*Assistant Examiner* — Sean Haiem
(74) *Attorney, Agent, or Firm* — Dickstein Shapiro LLP

(57) ABSTRACT

Method for compensating illumination deficiencies in microscopic "shape from focus (SFF)", wherein firstly the reflectance of the scene is estimated by way of a projector-camera system and then microscopic "shape from focus (SFF)" is applied to a stack of reflectance maps rather than to the original image data.

4 Claims, 4 Drawing Sheets

Fig. 1a
Fig. 1b
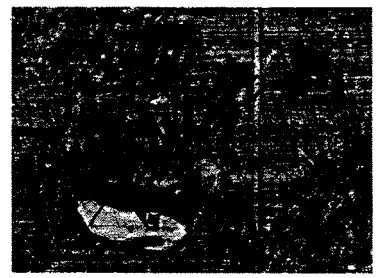
Fig. 2a
Fig. 2b
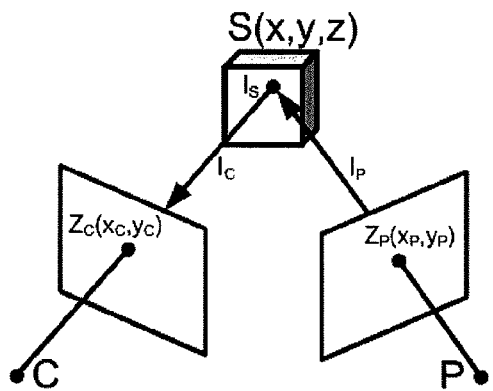
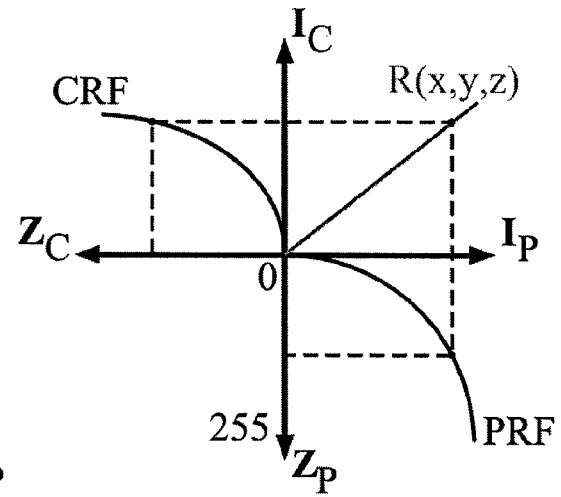

Fig. 5
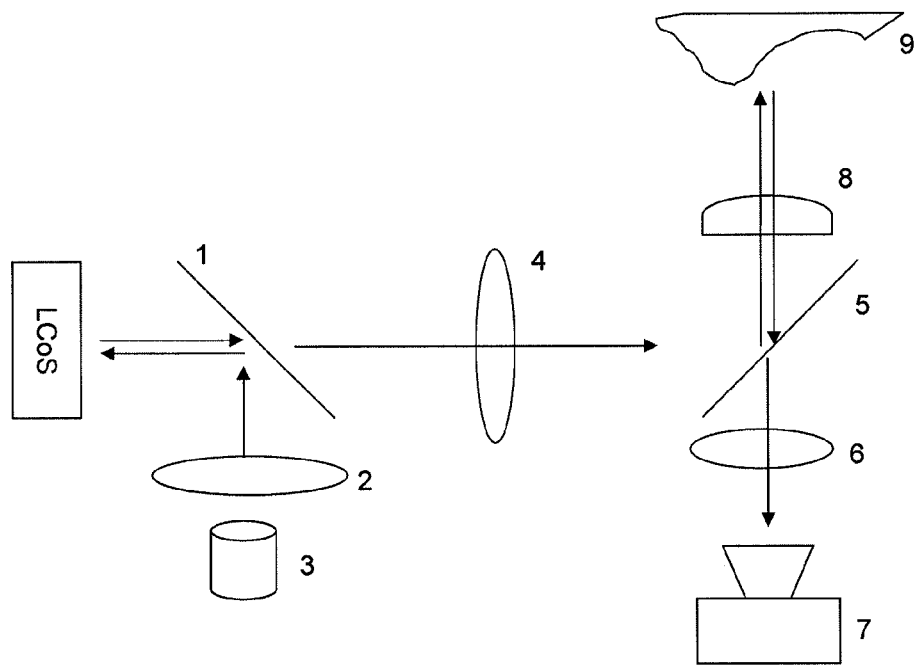
Fig. 6a
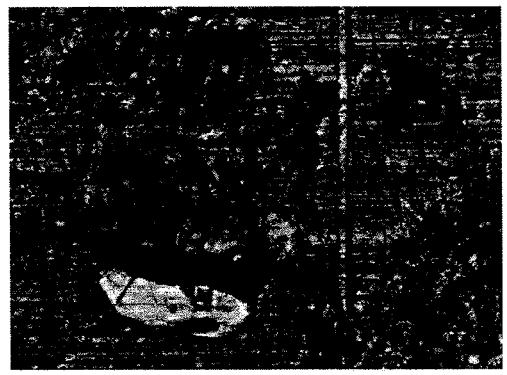
Fig. 6b

Fig. 7a
Fig. 7b
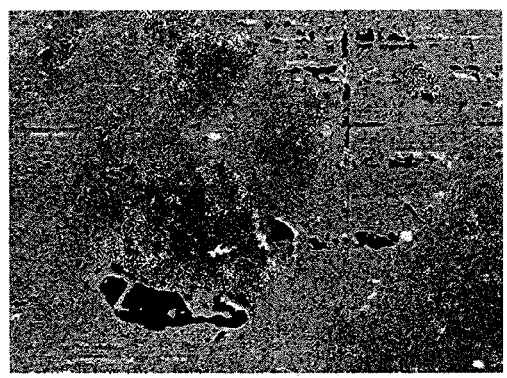
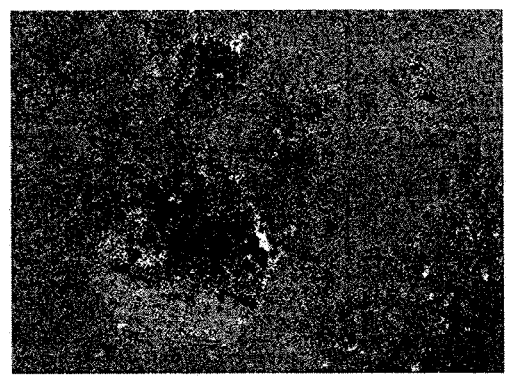

ESTIMATION OF DEFOCUSED REFLECTANCE MAPS FOR THE ROBUST DETERMINATION OF "SHAPE FROM FOCUS" IN MICROSCOPIC IMAGES

The invention relates to a method for compensating illumination deficiencies in microscopic "shape from focus (SFF)".

"Shape from focus (SFF)" is one of the most popular 3D reconstruction methods in optical microscopy. The working principle is based on identifying the focus maximum for scene points through acquisition of an image stack. The image stack is acquired by moving the scene towards the microscope objective in a defined way, so the focus maximum may be calculated into a geometric depth. Focus measure is usually formed on the basis of the image data, by viewing a local neighbourhood around each pixel. This is the result of a degree of high-frequency image portions in this neighbourhood or indirectly, respectively, of the image gradients or the local contrast.

Saturated image regions are the most challenging aspects for "shape from focus" methods, often resulting in noisy or only sparsely populated reconstructions results. Such image regions are common in industrial 3D metrology because of specular reflection and shading effects. In order to meliorate this problem, we introduce a novel concept, the defocused reflectance map (DRM). A DRM can be interpreted as an illumination neutral image of the scene (see FIG. 1), showing the same amount of defocus as the original camera image. We propose to replace the camera raw data by an image stack of DRMs and apply "shape from focus" thereto. Therefore it allows to cope with higher dynamics in the viewed scene, to estimate a more robust focus maximum and consequently achieve a denser object reconstruction.

Estimation of a DRM pixel value requires knowledge of the amount of incoming light $I_i$ and the amount of reflected light $I_r$ at the corresponding scene point. In the case of unknown scene geometry, $I_r$ cannot be derived from the camera image, because of the unknown amount of defocus at each pixel, which makes the problem ill-conditioned. This problem becomes even worse, if illumination intensity is modulated locally to account for highly dynamic differences in intensity on the object.

The invention is based on the task to estimate an approximate DRM from a known illumination pattern of the scene and the associated camera image in an iterative manner. The result should have the following properties: correctness of the focus maximum, suppression of saturation effects and stability of focus measure in the focused region under varying illumination. Correctness of the reflectance estimation itself, especially in the defocused regions, is of lesser concern, which allows us to simplify the estimation problem and according to the invention get a reasonable estimate of the values within merely two iterations.

The feasibility and benefits of our method are evaluated on the basis of synthetic and real-world data. We demonstrate that our system performs microscopic 3D re-constructions at least as accurate as standard shape from focus on scenes without saturation effects, and we show that our approach outperforms the standard algorithm on specular surfaces.

In this field the present invention for the very first time deals with the limitations and the improvement of standard "shape from focus" reconstruction methods with dynamic scene illumination by a projector-camera system.

A traditional "shape from focus" approach is described in[1]. The focus measure used therein is based on the Laplace operator. The described algorithm for the depth value estimation is based on the assumption of a Gaussian distribution of the focus values within the focus vector for the precise determination of the focus maximum. For an overview about focus measures, depth estimation algorithms and "shape from focus" algorithms we refer to[2-5].

Literature on radiometric illumination compensation has been published by Koninckx[6,7] or Gu[8] in the context of structured light 3D reconstructions methods and by Nayar[9,10] or Bimber[11-13] in the field of multimedia projections on untextured or dynamic scenes.

Noguchi and Nayar[14] were the first to address the problem of reconstructing untextured object surfaces by way of "shape from focus". The optical path of a light microscope was modelled analytically, and an optimal illumination filter pattern for a special focus measure was determined. This filter pattern was statically projected onto the object. Their experiments show good results for industrial samples. However, saturated image regions caused by e.g. specular highlights remain problematic.

Samson and Blanca have proposed an algorithm for contrast enhancement in light microscopy[15]. A projection system is used to generate illumination patterns for optimizing image acquisition of transparent samples. The light is automatically modulated depending on the image acquisition modality used. They experimentally show improvements in contrast and brightness.

Recently, Bimber et al.[16] announced a light microscope setup with a projector as illumination source to improve contrast and dynamic range for a human operator in real-time. The system is intended for visual observation only, and the problem of defocus of images has not been addressed.

In order to overcome the limitations of traditional "shape from focus" approaches, we propose a light microscope with a video beamer as light source. On the one hand, this approach allows for the compensation of the difference in intensity in saturated image regions, on the other hand, textures can be applied onto textureless image regions to make reconstruction possible in these regions (see[14]). Theoretically, illumination adaption for saturated image regions requires comprehensive knowledge of the full projector-camera imaging chain—including scene geometry and radiometric relations. While radiometric relations can be calibrated, the required scene geometry knowledge creates an "ill-conditioned" task.

By way of figures and figure descriptions, details of the invention and the background thereto will be explained, wherein:

FIGS. 1a and 1b show raw data of a camera image (FIG. 1a) and defocused reflectance map (FIG. 1b) of a microscopic image.

FIGS. 2a and 2b show geometric and radiometric relations in a projector-camera system[10] [6]. A 3D scene point S is illuminated by a projector pixel at location $(x_P, y_P)$ in the projector image plane, with an intensity value $Z_P$ (FIG. 2a). S is projected to a camera pixel $(x_C, y_C)$ with a resulting image intensity $Z_C$. In FIG. 2b, the radiometric chain from discrete projector pixel intensity $Z_P$ to projector irradiance $I_P$, camera irradiance $I_C$ and discrete camera intensities $Z_C$ is sketched. The mappings from discrete pixel values to irradiance values in projector and camera are modelled by the camera response function CRF and the projector response function PRF, respectively. Scene reflectance R is assumed to be linear, describing the relation of incoming and reflected irradiance on the sample surface (i.e. texture, shading and specularity).

FIG. 3 shows an image formation model (IFM). A discrete projector image $Z_P$ is mapped to an irradiance pattern $I_P$ in the projector (I). $I_P$ undergoes a geometry dependent low-pass filtering because of defocusing in the optical system (II), and is reflected on the object surface (III). The reflected irradiance pattern $I_S$ undergoes defocusing again (IV) and is finally mapped to discrete values $Z_C$ by the imaging sensor (V).

FIG. 4 shows iterative reflectance estimation. The discrete projector pattern $Z_{Pi}$ results in a camera image $Z_{Ci}$ through physical image formation (FIG. 3). In the estimation process we map $Z_{Pi}$ and $Z_{Ci}$ to the respective irradiance patterns (I and II). $I_{Pi}$ then undergoes a low-pass filtering (III), before scene reflectance R of the scene is estimated (IV). Using a given R and a desired camera irradiance $\hat{I}_C$, we are now in the position to calculate an improved projector pattern $Z_{Pi+1}$ (V).

FIG. 5 shows a schematic projector-camera microscope set-up having 1=PBS, 2=condenser, 3=light source, 4=projector lens, 5=PBS, 6=ocular, 7=camera, 8=objective, 9=scene.

FIGS. 6a and 6b show an estimated DRM for a metal surface. The camera image (FIG. 6a) is compared to the DMR after one iteration (FIG. 6b).

FIGS. 7a and 7b show focus maxima estimated on the raw camera data (FIG. 7a) and estimated DRMs (FIG. 7b). The input images correspond to those of FIG. 5.

In the following, there is presented a short overview about an analytical model of the radiometric mapping in projector-camera systems.

Several relations between a projector and a camera exist when a projector is used as an illumination source for a scene which is acquired by a camera. Firstly, there is a geometric mapping between camera and projector. In this section, we assume that this mapping is known and, hence, we know which camera pixels are affected by a single projector pixel and vice versa. Secondly, a radiometric mapping between projector intensities and camera intensities determined on the side of the camera can be established, if the scene surface geometry and its surface characteristics are known. This section gives a short overview about the main principles of the main components required for the radiometric camera-projector mapping between projector and camera.

The basics required for the sections below are briefly introduced here:

Assume having a projector-camera setup with known geometric relations (see FIG. 2(a) for an illustration): Scene point S (x, y, z) is illuminated by a projector pixel with coordinates $(x_P, y_P)$ and intensity $Z_P (x_P, y_P)$. S is mapped to image coordinates $(x_C, y_C)$, resulting in a camera intensity $Z_C(x_C, y_C)$. According to [6], the following relations and ratios may be formulated:

$$I_C(x_C, y_C) = CRF(Z_C(x_C, y_C))/\Delta t \quad (1)$$

$$I_P(x_P, y_P) = PRF(Z_P(x_P, y_P)) \quad (2)$$

$$I_C(x_C, y_C) = I_P(x_P, y_P) R(x,y,z) \quad (3)$$

R (x, y, z) denotes the surface reflectance in S (x, y, z), as described in FIG. 2b. CRF and PRF define the camera and the projector response functions. The response functions are non-linear but monotonically increasing and represent the mapping between irradiance values and discrete intensity values. The scalar value $\Delta t$ is the exposure time of the camera used during image acquisition.

Figure 3:
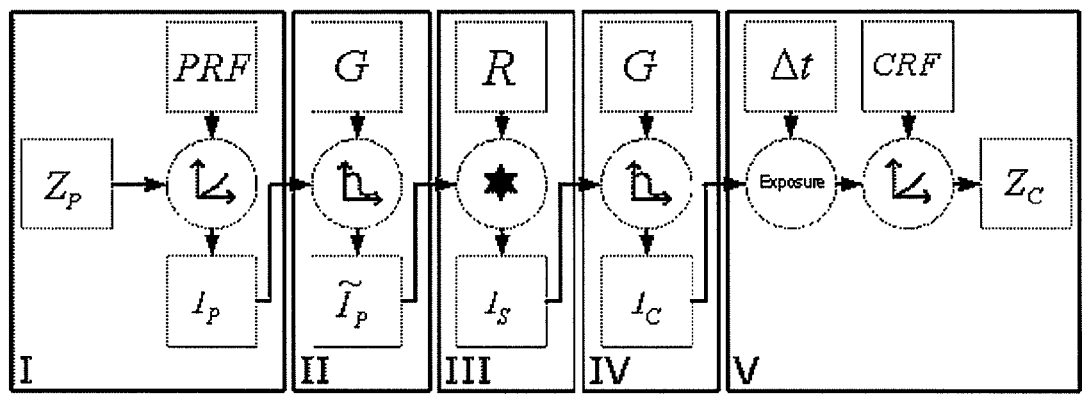
Figure 4:
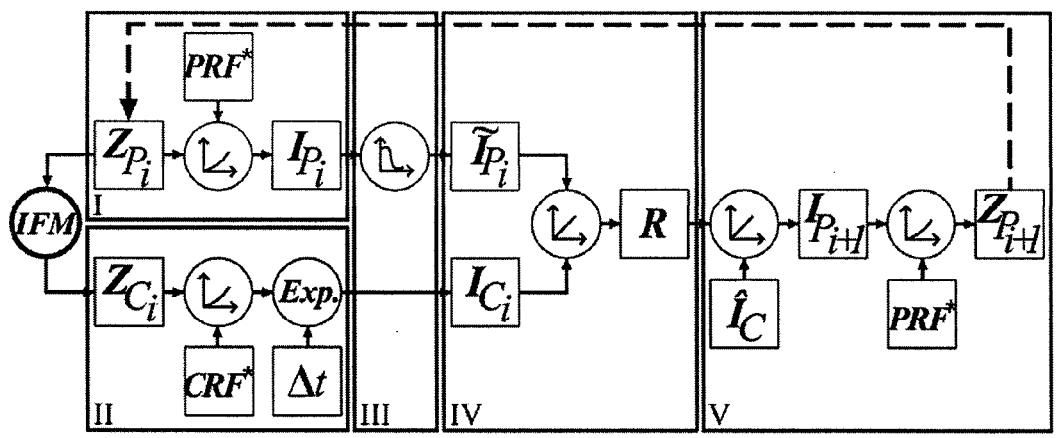

The radiometric relations between camera, projector and surface reflectance are illustrated in FIG. 3. A discrete projector intensity value $Z_P$ is mapped to a discrete camera intensity $Z_C$ by mapping to a projector irradiance via PRF. The projector irradiance value $I_P (x_P, y_P)$ is reflected from the scene surface according to reflectance R (x, y, z). The resulting camera irradiance $I_C (x_C, y_C)$ is integrated over exposure time $\Delta t$ before it is mapped to the discrete camera value $Z_C (x_C, y_C)$ by way of CRF function.

Methodology:

In optical microscopy, the dynamic range of images is often high, because of specular reflections and shading effects on optically rough surfaces. In order to avoid saturated image regions, a projector is used as a light source instead of a homogeneous light source. The projector allows for local modulation of the light intensity. This means that for each image within an image stack used for "shape from focus" over- or undersaturated image regions may be compensated for and so the image texture can be extracted.

As a consequence, the non-constant illumination for the images within an image stack will change the focus maxima of a scene pixel due to varying illumination modulations when the stack is analyzed using traditional SFF methods. Therefore, the raw image data of the camera in a system with an adapted illumination cannot be used directly for evaluation by means of SFF. Furthermore, the lacking knowledge on scene geometry does not allow exact information about the defocus level of a projected illumination pattern for certain scene points. For that reason, one and the same projection pattern cannot be used for image acquisition of a scene for SFF with varying depth values within an object.

In order to overcome these problems, we propose to estimate a defocused reflectance map by way of the camera image and the illumination pattern used during acquisition of the image. The illumination pattern used is probably blurred in at least some image regions. Hence, the reflectance map cannot be exactly determined. Still, it serves as an illumination neutral image of the scene texture allowing to extract the relative focus maxima of the image stack.

In the following, the process of the image formation in a microscope with little depth focus and a co-axially aligned projector as light source is modelled (see section "Image formation model"). An algorithm for the illumination compensation process (see section "Estimation of defocused reflectance maps") is developed on the basis of the image formation model. This algorithm minimizes the dynamic range of the scene from the observing camera's viewpoint and gives a good estimate of the scene's reflectance including texture information. This texture information is then used for the "shape from focus" algorithm.

Image Formation Model:

The image formation process can be divided into four sub-processes: pattern projection (I), optical defocusing (II, IV), reflection on a textured surface (III) and image acquisition (V). In the following, these sub-processes are being explained in detail.

The input for the projection process is a discrete projection pattern $Z_P$. According to a projector response function PRF, the discrete image is transformed to irradiance values $I_P$. The projected pattern will not be in focus on the whole scene surface. Optical defocus is modelled by a low-pass filter kernel (convolution with a "pillbox kernel"), with the radius of the "pillbox kernel" corresponding to the distance of the focus plane to the object at each pixel. The amount of defocus consequently depends on the surface geometry G, especially on the depth at each surface point. The projected and defocused light rays $\tilde{I}_P$ are reflected from the surface, in accordance with the reflectance function R, which is assumed to be linear.

The reflected light rays ($I_C$) undergo the same defocusing mappings as the projector pattern, resulting in $\tilde{I}_C$. During image acquisition, the reflected irradiance is integrated over exposure time $\Delta t$. The exposure intensity resulting therefrom is mapped to discrete image intensities $Z_C$ by the nonlinear camera response function CRF.

Debevec[17] proposed a method for determining the CRF and, analogously thereto, the PRF without knowledge of the surface properties. The remaining unknown variables are the surface geometry, which should be determined by the "shape from focus" algorithm, and the reflectance properties of the surface. An iterative solution for the 3D reconstruction with adaptive illumination is presented in the next section.

Estimation of Defocused Reflectance Maps:

We take a closer look at the image formation model in FIG. 3. Only the discrete projection pattern $Z_P$, the exposure time $\Delta t$ and the discrete camera image $Z_C$ are known. Although the camera and projector response functions are not exactly known, good estimates (CRF*, PRF*) can be created in a pre-calibration process[17].

Two crucial components are unknown: the scene geometry and its reflectance properties. We first consider the reflectance characteristics estimation process for a single pixel. We define a desired camera irradiance $\hat{I}_C$ (e.g. $\hat{I}_C$=CRF (128)/$\Delta t$).

In an iteration i, we project irradiance $I_{Pi}$ and receive the camera irradiance $I_{Ci}$. According to equation (3), we compute $R_i$ from $I_{Pi}$ and $I_{Ci}$. Because of possible non-linearities in the reflectance function, or a bad initialization of $I_{Pi}$, $I_{Ci}$ may deviate from $\hat{I}_C$. For this reason, we repeat the estimation process by calculating $$I_{Pi+1} = \hat{I}_C/R_i, \quad (4)$$

for the next iteration. The process is repeated until $[R_{i-1}-R_i]$ falls below a predetermined threshold value.

In order to generalize this method to the two-dimensional case, we need to consider different resolutions of camera and projector. Consequently, a single projector pixel, which ideally is a rectangular light source, affects several camera pixels. Because of defocusing and scattering effects, a single projector pixel will not illuminate a precisely delimited rectangular region on the camera. We model the incoming irradiance to a surface region corresponding to a camera pixel and emitted by a single projector pixel through a point spread function (PSF):

$$I_S(x_C, y_C) = PSF_n(I_{P_n}, x_C, y_C), \quad (5)$$

wherein $PSF_n(I, x, y)$ denotes the value of the point spread function of the $n^{th}$ projector pixel at location $(x, y)$ in an image and wherein there has been applied a projector irradiance I. We use a thin-plate spline to model the PSF functions and determine their exact parameters in an offline calibration step. The influence of all. N projector pixels on a single surface region is given by $$I_S(x_C, y_C) = \sum_{n=1}^{N} PSF_n(I_{P_n}, x_C, y_C) \quad (6)$$

As a consequence, the mapping function of the vector of all projector irradiances $I_P$ to the vector of all M scene irradiances $I_S$ is defined by the relation $$I_S = AI_P. \quad (7)$$

The mapping matrix A has the dimension of m×n. The mapping matrix is sparsely occupied, because one projector pixel only influences a small section of the image scene. The inverse problem of mapping scene irradiances to projector irradiances can be derived from equation (7). The solution corresponds to the problem of finding x, which minimizes $\|Ax-b\|$ for the problem $Ax=b$. We solve for $I_P$ in the linear least-squares manner using normal equations by computing the following expression $$I_P = (A^T A)^{-1} A^T I_S, \quad (8)$$

Both, the forward mapping matrix A and the inverse mapping matrix $(A^T A)^{-1} A^T$ may be calculated in advance.

Until now, we have assumed that the projector and the camera are perfectly in focus. In practice, this assumption is ineffective because of the unknown surface geometry, which is usually non-planar. In defocused regions, the projector irradiance and the camera irradiance patterns are low-pass filtered, and thus the PSF becomes broader. Hence, the reflectance map cannot be exactly estimated. For extremely defocused regions, an inexact reflectance estimate is of lesser concern. On the contrary, slightly defocused regions will result in noisy reflectance maps and will therefore influence the focus maxima when used in "shape from focus". Therefore, we apply a low-pass filter to the projected irradiance pattern before estimating defocused reflectance maps.

Experiments:

In this section, we evaluate the proposed algorithm on synthetic data as well as real world data. We demonstrate that our SFF approach will deliver the same results as standard SFF for unsaturated image regions, although the projected pattern varies during the image stack acquisition. The real world image data experiments show that our approach outperforms the classic SFF algorithm on saturated image regions in highly dynamic scenes.

Synthetic Data:

Using the image formation model (see FIG. 3), we generate synthetic "shape from focus" image stacks on the basis of ground truth data. We assume a 1:1 pixel correspondence between camera and projector to simplify matters in all synthetic experiments. Image texture at each pixel is generated randomly, following a uniform distribution function. Depth at each pixel is calculated according to a horizontally tilted plane in front of the camera.

The image stack is generated by applying a depth dependent low-pass filter at each scene pixel. Furthermore, the scene is illuminated with a user-specific pattern, which is also smoothed according to the scene depth. The camera and projector response functions are also assumed to be known.

Two image stacks consisting of 21 images each are generated with varying illumination: Firstly, a uniform and constant pattern is used for scene illumination. Then we illuminate the scene for each acquired image with a new random illumination pattern. A classic SFF algorithm[1], using the squared Laplacian operator as a focus measure, is applied to the raw image data of the first stack, and to the stack of estimated DRMs of the second stack.

For the first stack, the relative error between the depth map generated by the standard approach and the known ground truth depth map is 14.3% of the step size used (standard deviation 12.6%). For the second stack, the relative difference between the ground truth depth map and our approach is 16.4% (standard deviation 17.1%).

Real Data:

For real world data experiments, we implemented a microscope prototype with a projector as a co-axial illumination source on an optical bench. We used a 2 MP grayscale CCD camera and a 1280×720 pixel LCoS display for light modulation. A highly accurate translational stage is used to move a specimen at an accuracy of 1 μm. We chose a region of 574×420 camera pixels in the experiments, which corresponds to 75×60 projector pixels, for the experiments. The camera and the projector share a common focus plane. The radiometric and geometric relations of the projector-camera system are precalibrated.

In order to evaluate reconstruction accuracy for estimated DRMs, we compare the stability of the focus maximum received from the standard shape from focus algorithm in regard to a non-saturated image stack with our results. Each pixel that is saturated or closely saturated somewhere within the reference image stack is masked.

In a first experiment, we show that our approach is able to tolerate random patterns that are projected during the image acquisition. In this experiment the scene hereby is a planar specimen that is placed diagonally in front of the microscope. During image acquisition, a different pattern is projected after each depth step, and an image is acquired. We use the proposed control loop to estimate a reflectance map for the scene. For the reference image stack, an additional image is acquired under uniform and constant illumination.

Depth maps are calculated from both the DRMs and the reference stack. A total of 96.97% of the camera pixels in the evaluation region is not saturated in both image stacks and, hence, cannot be used for analysis accordingly. The mean relative error between the classically computed depth map and the result from our approach is $-0.02$ μm (standard deviation of 0.81 μm). The depth step $\Delta d$ between two consecutive images during image acquisition is 5 μm. With an average relative error of 0.4% for the depth step, there is not given any crucial systematic deviation between the two approaches for unsaturated image pixels.

The advantage of the adaptive illumination for "shape from focus" becomes noticeable when measuring a highly dynamic scene. Using the classical approach, noisy results are computed in problematic regions (see FIG. 7a). In contrast, SFF on DRMs is able to handle shading and saturation effects better. FIG. 7b shows a dense reconstruction based on DRMs, estimated with a single iteration. Hence, only two images per depth step are acquired.

In this work, we have shown that it is possible to estimate illumination neutral images in a microscopic projector-camera setup. We estimate the defocused reflectance maps (DRMs), iteratively from very few (e.g. only two) image acquisitions. We use the DRMs as input for a standard "shape from focus" algorithm to estimate depth maps. Our experiments have shown that we receive the same focus maxima as the traditional shape from focus approach in unsaturated image regions, although we varied illumination patterns for the image acquisition in each different depth step. At the same time, we are able to handle shading effects and specular reflections better than the classical approach.

At the moment, the limiting factors of our method are the high computational effort and memory consumption, and an effective doubling of the number of acquired images. We seek to overcome this problem by re-using the illumination pattern from the previous depth step as the initial compensation pattern for the current depth step. In addition, "shape from defocus" strategies could be involved to estimate the defocus level for certain scene points and thus facilitate DRM estimation by way of additional prior knowledge.

There is presented a novel method for compensating illumination deficiencies in "shape from focus" (SFF) in microscopy images. In microscopic image acquisitions, surface texture is present rather frequently, but it cannot always be used because of extreme scene image dynamics and because the texture is not always visible. Consequently, using shape from focus, saturated or too dark image regions prevent reliable depth information estimation. In order to overcome this limitation, scene reflectance is estimated in a first step by means of a projector-camera system, and the SFF algorithm is subsequently applied to the reflectance maps determined in this way instead of to the original image date. We solve this ill-conditioned estimation problem iteratively through adaptive pattern projection, and we prove experimentally that the focus measure maximum remains stable due to this method and even becomes more robustly determinable in saturated regions.

REFERENCES

1. Nayar, S.: Shape from Focus System. In IEEE Conference on Computer Vision and Pattern Recognition (CVPR). (1992) 302-308
2. Nayar, S., Nakagawa, Y.: Shape from Focus: An Effective Approach for Rough Surfaces. In: Int. Conf. on Robotics and Automation. Volume 1. (1990) 218-225
3. Nayar, S., Nakagawa, Y.: Shape from focus. Pattern Analysis and Machine Intelligence, IEEE Transactions on 16 (1994) 824-831
4. Helmli, F., Scherer, S.: Adaptive shape from focus with an error estimation in light microscopy. (2001) 188-193
5. Malik, A., Choi, T.: A novel algorithm for estimation of depth map using image focus for 3d shape recovery in the presence of noise. 41 (2008) 2200-2225
6. Koninckx, T. P., Peers, P., Dutre, P., Van Gool, L.: Scene-adapted structured light. In: CVPR '05: Proceedings of the 2005 IEEE Computer Society Conference on Computer Vision and Pattern Recognition (CVPR'05)—Volume 2, Washington, D.C., USA, IEEE Computer Society (2005) 611-618
7. Koninckx, T., Van Gool, L.: Real-time range acquisition by adaptive structured light. Pattern Analysis and Machine Intelligence, IEEE Transactions on 28 (2006) 432-445
8. Gu, J., Nayar, S., Grinspun, E., Beihumeur, P., Ramamoorthi, R.: Compressive structured light for recovering inhomogeneous participating media. In: ECCV08. (2008) 845-858
9. Fujii, K., Grossberg, M. D., Nayar, S. K.: A projector-camera system with real-time photometric adaptation for dynamic environments. In: CVPR '05: Proceedings of the 2005 IEEE Computer Society Conference on Computer Vision and Pattern Recognition (CVPR'05)—Volume 2, Washington, D.C., USA, IEEE Computer Society (2005) 1180
10. Grossberg, M., Peri, H., Nayar, S., Belhumeur, P.: Making one object look like another: Controlling appearance using a projector-camera system. In: CVPR04. (2004) 452-459
11. Grundhofer, A., Bimber, O.: Real-time adaptive radiometric compensation. IEEE Transactions on Visualization and Computer Graphics 14 (2008) 97 108
12. Bimber, O., Emmerling, A., Klemmer, T.: Embedded entertainment with smart projectors. In: SIGGRAPH '05: ACM SIGGRAPH 2005 Courses, New York N.Y., USA, ACM (2005) 8
13. Wetzstein, G., Bimber, O.: Radiometric compensation of global illumination effects with projector-camera systems. In: SIGGRAPH '06: ACM SIGGRAPH 2006 Research posters, New York, N.Y., USA, ACM (2006) 38
14. Noguchi, M., Nayar, S.: Microscopic shape from focus using active illumination. (1994) A:147-152
15. Samson, E. C., Blanca, C. M.: Dynamic contrast enhancement in widefield microscopy using projector-generated illumination patterns. New Journal of Physics 9 (2007)
16. Bimber, O., Klock, D., Amano, T., Grundhofer, A., Kurz, D.: Closed-loop feedback illumination for optical inverse tone-mapping in light microscopy. In: To appear in IEEE Transactions on Visualization and Computer Graphics. (2010)
17. Debevec, P., Malik, J.: Recovering high dynamic range radiance maps from photographs. (1997) 369-378

The invention claimed is:

1. A method for compensating illumination deficiencies in microscopic "shape from focus (SFF)", wherein the reflectance of a microscopic scene is estimated by way of a projector-camera system and then microscopic "shape from focus (SFF)" is applied to a stack of reflectance maps instead of to original image data.

2. A method according to claim 1, the step of estimating the reflectance of the microscopic scene comprises iterative projection of an adaptive illumination pattern.

3. A method according to claim 1, wherein the microscopic scene is illuminated by an adaptive illumination source.

4. A method according to claim 3, wherein the adaptive illumination source is a micro-projector.

* * * * *